UNITED STATES PATENT OFFICE.

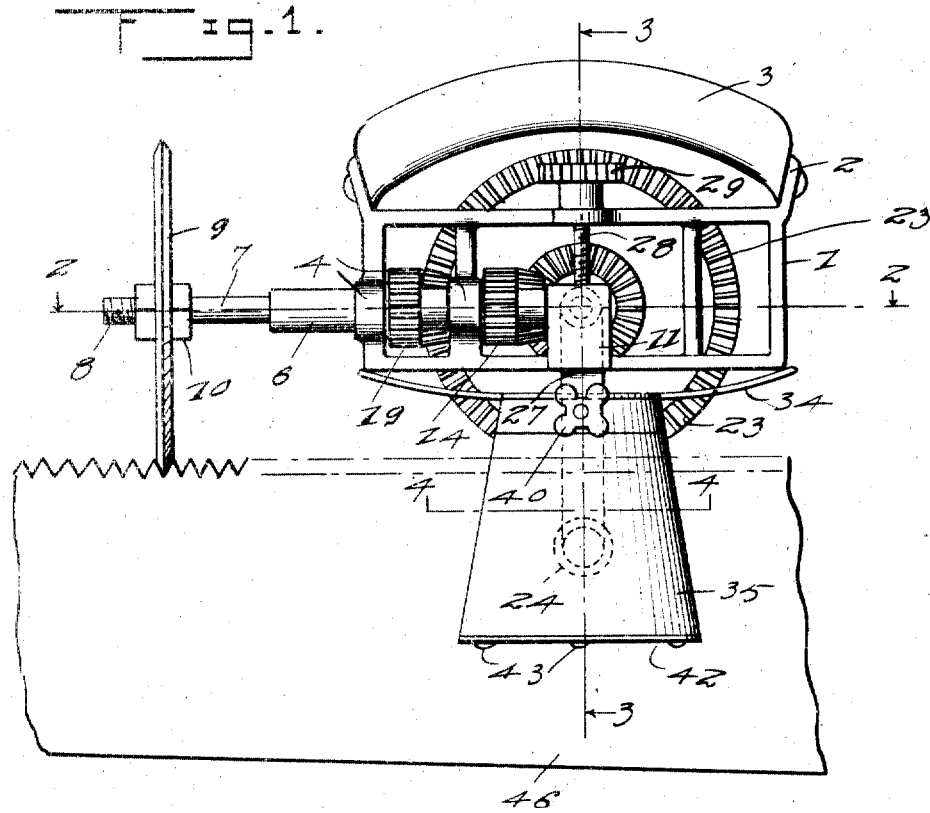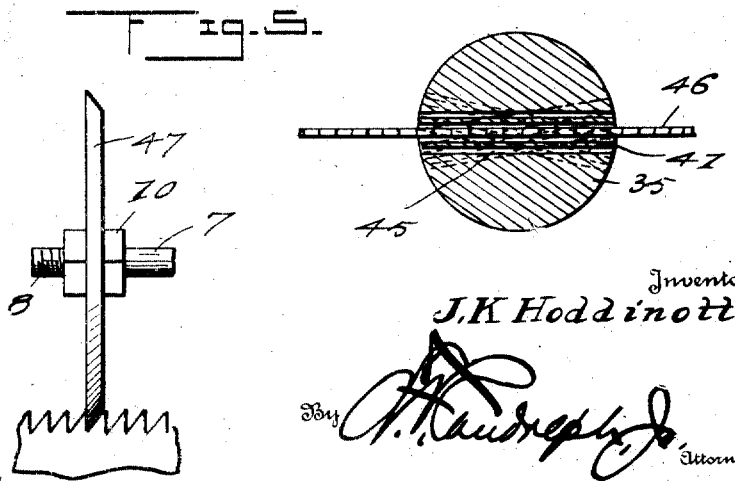

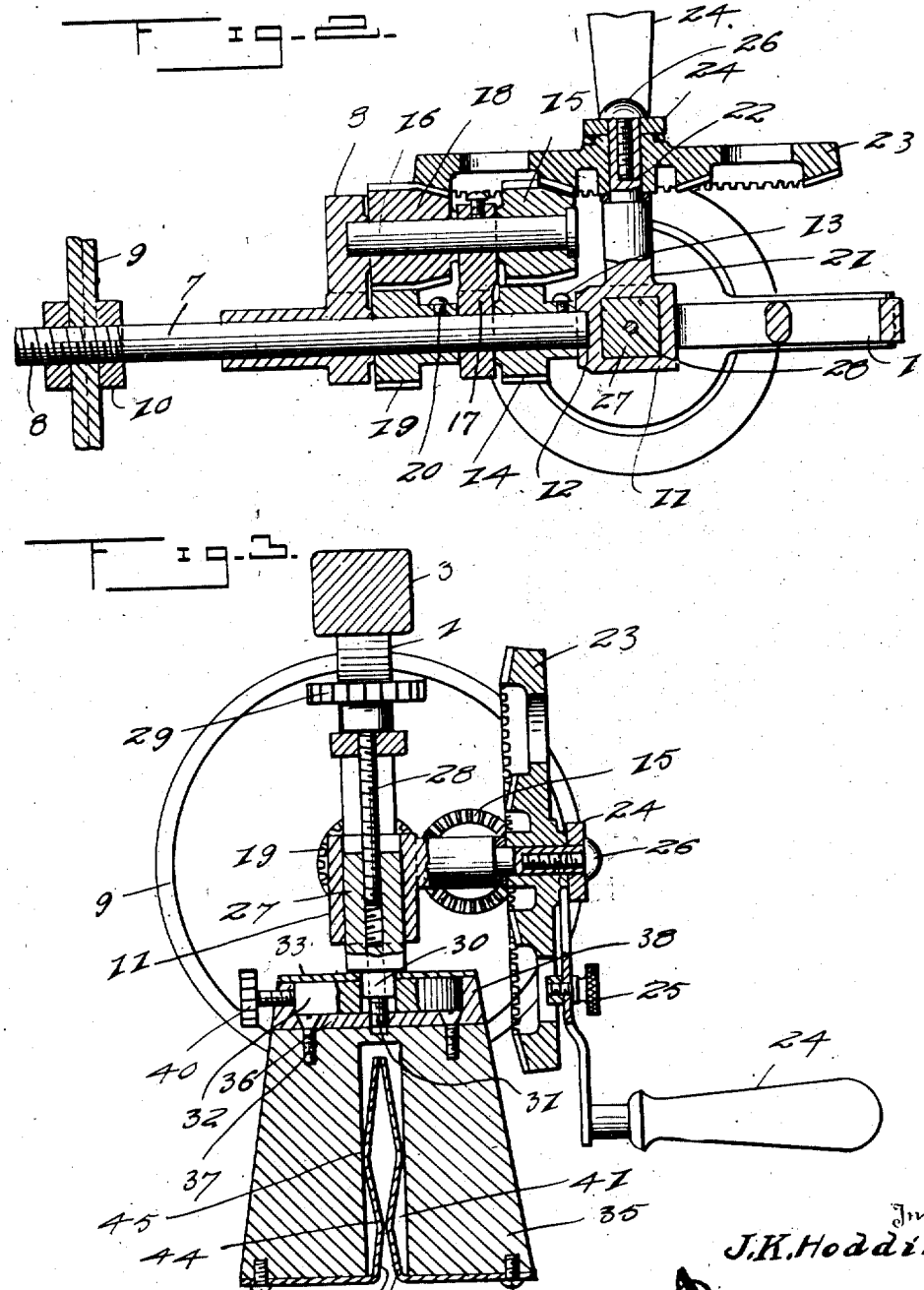

JOHN K. HODDINOTT, OF BALTIMORE, MARYLAND, ASSIGNOR OF ONE-FOURTH TO JOHN F. HODDINOTT AND ONE-HALF TO WILLIAM VAN PELT MONTGOMERY, BOTH OF BALTIMORE, MARYLAND.

SAW-SHARPENER.

1,250,880.  Specification of Letters Patent.  Patented Dec. 18, 1917.

Application filed December 6, 1916. Serial No. 135,400.

*To all whom it may concern:*

Be it known that I, JOHN K. HODDINOTT, a citizen of the United States, residing at Baltimore, State of Maryland, have invented certain new and useful Improvements in Saw-Sharpeners; and I do hereby declare the following to be a full, clear, and exact description of the invention, such as will enable others skilled in the art to which it appertains to make and use the same.

This invention relates to a saw sharpener and has for one of its objects the provision of a base for receiving a saw and having means thereon for sharpening the teeth upon the saw.

Another object of this invention is to provide a rotating stone on the base for engaging and sharpening the teeth of the saw.

A further object of this invention is the provision of means whereby the grinding stone may be moved toward and from the teeth of the saw as desired, so as to increase and decrease the depth of sharpening the teeth.

A further object of this invention is to provide means for permitting the stone to be moved laterally of the saw whereby the teeth of the saw may be sharpened at various angles.

A still further object of this invention is the provision of a saw sharpener of the above stated character, which shall be simple, durable and efficient, and which may be manufactured and sold at a comparatively low cost.

With these and other objects in view as will become more apparent as the description proceeds, the invention consists of certain features of construction, combination and arrangement of parts as will be hereinafter more fully described and claimed.

For a complete understanding of my invention, reference is to be had to the following description and accompanying drawings, in which:

Figure 1 is a side elevation of a saw sharpener constructed in accordance with my invention, Fig. 2 is a horizontal sectional view taken on the line 2—2 of Fig. 1, Fig. 3 is a vertical sectional view taken on the line 3—3 of Fig. 1, Fig. 4 is a horizontal sectional view taken on the line 4—4 of Fig. 1, illustrating the means for permitting the base and stone to move laterally of the saw.

Fig. 5 is a detail view of a modified form of grinding stone.

Referring in detail to the drawings, the numeral 1 indicates a supporting frame having formed thereon, a pair of relatively spaced extensions 2, to which is secured a suitable handle or hand grip 3. Bearings 4 are formed on the frame 1 and have journaled therein a sleeve 6 in which is secured a shaft 7 having its free end screwthreaded as illustrated at 8. Mounted upon the screwthreaded end 8 of the shaft 7 is a grind or emery stone 9 having beveled edges as clearly illustrated in Fig. 1. The stone 9 is held upon the shaft 7 by lock nuts 10. A squared housing 11 is formed on the frame 1 and has a recess 12 to receive the inner end of the shaft 7. The inner end of the shaft 7 has secured thereon by means of a set screw 13, a gear wheel 14, which meshes with an idle gear 15. The idle gear 15 is journaled upon a stub shaft 16 carried by an offset extension 17 on the frame 1. An idle gear 18 is also journaled upon the stub shaft 16 and meshes with a gear 19 secured to the shaft 7 by means of a set screw 20. When it is desired to change the speed of the shaft 7, one of the set screws 13 or 20 is turned to lock its respective gear to the shaft 7, while the other set screw is turned from engagement with the shaft 7, freeing its respective gear and permitting it to turn upon the shaft freely.

A sleeve 21 is formed upon the squared housing 11 and has therein a shaft 22 on which is journaled a crown gear 23 that meshes with the idle gears 15 and 18 for rotating the shaft 7. A suitable crank handle 24 has its end bifurcated to engage the hub of the crown gear 23 and is secured by means of a set screw 25 to one of the spokes of the crown gear. The crown gear 23 is rotatably mounted upon the shaft 22 and is held thereon by a set screw 26 threaded to the shaft as clearly illustrated in Fig. 3. By turning the handle 24, the crown gear 23 will be rotated which through the idle gears 15 and 18 and gears 14 and 19 rotate the shaft 7 carrying the stone 9.

A squared shank 27 is located within the squared housing 11 and has an adjusting rod 28 screwthreaded therein which is carried by the frame 1 and has an operating handle 29 thereon for regulating the height of the squared shank 27 within the squared housing 11. Formed on the lower end of the squared shank 27 is a reduced squared shank 30 on which is formed a screwthreaded extension 31. A circular plate 32 has a squared opening to receive the squared reduced shank 30 of the squared shank 27 permitting the screwthreaded extension 31 to extend therethrough. Secured to the plate 32 is a plate 33 on which are formed oppositely disposed resilient arms 34 which engage the frame 1 as illustrated in Fig. 1.

A tapering base 35 has secured to its upper end a plate 36 by means of screws 37. The plate 36 has an annular flange 38 formed thereon for receiving the plate 32. The plate 36 is provided with an internally screwthreaded centrally arranged aperture for receiving the screwthreaded extension 31 for securing the base 35 to the squared shank 27. The flange 38 is provided with an internally screwthreaded aperture to receive a set screw 40 which engages the plate 32 and locks the base 35 against rotation upon the screwthreaded extension 31 and which will permit the base 35 to be rotated upon the extension 31 whenever desired by releasing the tension of the set screw 40 upon the plate 32.

The base 35 has a vertical slot 41 in which are positioned resilient clamping arms 42 which have their lower ends bent at right angles and underlie the base 35 and are secured thereto by screws 43. The ends of the spring arms which are disposed within the vertical slot 41 are bent in the direction of each other as illustrated at 44 to grip a saw when inserted therebetween and within the vertical slot 41. The arms 42 are bent outwardly and engage the walls of the slot 41 as illustrated at 45 to form a bearing for the arms within the vertical slot 41 and their free ends are bent in the direction of each other to coöperate with the portion 44 in gripping a saw when inserted between the spring arms.

In operation, a saw 46 is placed between the spring arms 42 in the vertical slot 41 with the teeth thereon directed upwardly, permitting the stone 9 to engage the teeth as illustrated in Fig. 1. By holding the hand grip 3 in one hand and rotating the crown gear 23 by the crank handle 24, the stone will be rotated thereby sharpening the teeth upon the saw. The stone 9 may be moved toward and from the teeth as desired by pushing downwardly upon the hand grip 3 against the tension of the resilient arms 3 on the plate 33 which permits the supporting structure 1 to move downwardly or upwardly in relation to the saw 46, thus regulating the depth of sharpening the teeth upon the saw 46. If the spring arms 34 will not permit a sufficient adjustment of the stone 9, by turning the adjusting rod 28 within the frame, the stone 9 may be further adjusted upwardly or downwardly with relation to the saw. If desiring to grind the teeth upon the saw 46 at an angle, the frame 1 and base 35 are permitted to be slightly turned laterally of the saw by the spring gripping arms 42 as illustrated in Fig. 4, whereby the stone 9 is disposed at a slight angle with relation to the teeth to permit the teeth to be sharpened at an angle which is necessary in some type of saws.

The stone 9 may be readily removed from the shaft 7 by releasing or removing the lock nuts 10 and another form of stone may be applied thereon, such as shown in Fig. 5, having only one beveled edge 47 for sharpening teeth upon certain types of saws.

I do not wish to be limited to any specific construction of stone, and therefore reserve the privilege of applying any type of stone that may be necessary in grinding or sharpening saw teeth of various types of saws.

If the spring arms 42 do not permit the supporting structure 1 and base 35 to be moved laterally of the saw sufficiently to properly sharpen the teeth thereon, the set screw 40 in the flange 38 may be removed permitting the base 35 to be turned in relation to the supporting structure 1, thus placing the stone at any angle in the arc of a circle with relation to the teeth upon the saw.

While I have shown and described the preferred embodiment of my invention, it will be understood that minor changes in construction, combination and arrangement of parts may be made without departing from the spirit and scope of the invention as claimed.

Having thus described my invention, what I claim is:

1. A saw sharpener comprising a supporting structure, a shaft journaled in the supporting structure, a stone secured to the shaft, means for rotating the shaft, a shank adjustably secured to the supporting structure, a base adjustably secured to the shank and having a vertical slot, and means within the vertical slot for clamping a saw therein.

2. A saw sharpener comprising a supporting structure, a shaft journaled in the supporting structure, a stone secured to the shaft, means for rotating the shaft, a squared housing formed in the supporting structure, a squared shank slidable in the squared housing, means for adjusting the squared shank upwardly and downwardly within the squared housing, a base detachably secured to the shank and having a vertical slot, and means located within the vertical slot for receiving and gripping a saw.

3. A saw shapener comprising a supporting structure, a hand grip secured to the supporting structure, a shaft journaled to the supporting structure, a stone secured to the shaft, means for rotating the shaft, a squared housing formed in the supporting structure, a squared shank slidable within the squared housing, an adjusting rod carried by the supporting structure and threaded to the squared shank for moving said shank upwardly and downwardly within the squared housing, a base detachably secured to the shank and having a vertical slot, and means located within the vertical slot to receive and grip a saw.

4. A saw sharpener comprising a supporting structure, a hand grip secured to the supporting structure, a shaft journaled to the supporting structure, a stone secured to the shaft, means for rotating the shaft, a shank adjustably secured to the supporting structure, a plate carried by the shank, resilient arms formed on the plate and engaging the supporting structure, a base secured to the plate and having a vertical slot, means located within the vertical slot for receiving and gripping a saw.

5. A saw sharpener comprising a supporting structure, a shaft journaled in the supporting structure, a stone secured to the shaft, means for rotating the shaft, a squared shank adjustably secured to the supporting structure, a plate carried by the shank, resilient arms formed on the plate and engaging the supporting structure, a plate formed on the first mentioned plate, a base threaded to the shank and having a vertical slot, means for locking the base to the last mentioned plate, and means located within the vertical slot to receive and grip a saw.

6. A saw sharpener comprising a supporting structure, a stone supported by the supporting structure, means for rotating the stone, a shank adjustably secured to the supporting structure, a plate carried by the supporting structure, a plate threaded to the shank and having an annular flange to receive the first mentioned plate, a block secured to the second mentioned plate and having a vertical slot, a set screw carried by the flange and engaging the first mentioned plate to lock the base against rotation with relation to the frame, and means located within the vertical slot to receive and grip a saw.

7. A saw sharpener comprising a supporting structure, a rotatable stone carried by the supporting structure, means for rotating the stone, a base adjustably and rotatably secured to the supporting structure, means for locking the base against rotation with relation to the supporting structure, said base having a vertical slot, and resilient arms located within the vertical slot to receive and grip a saw.

8. A saw sharpener comprising a supporting structure, a shaft journaled in said supporting structure, a stone carried by the shaft, gears secured to the shaft, idle gears journaled to the supporting structure and in mesh with the first mentioned gears, a crown gear journaled to the supporting structure and in mesh with the idle gears, means for rotating the crown gear to rotate the stone, and means adjustably and flexibly secured to the supporting structure for receiving and holding a saw.

9. A saw sharpener comprising a supporting structure, a rotatable stone carried by said supporting structure, means for rotating the stone, a base adjustably and rotatably secured to the supporting structure, means for locking the base against rotation with relation to the supporting structure, said base having a vertical slot, and resilient arms located within the vertical slot to receive and grip a saw, said arms being bent in the direction of each other at one point to grip the saw and being bent in the opposite direction to engage the wall of the slot to form a bearing for said arms in said slot.

10. A saw sharpener comprising a base having a slot to receive a saw, yieldable securing means within the slot for receiving and gripping the saw, supporting means carried by the base, and sharpening means carried by said supporting means for sharpening the teeth of the saw.

In testimony whereof I affix my signature in presence of two witnesses.

JOHN K. HODDINOTT.

Witnesses:
  Mary Muelle,
  F. Henry March.